United States Patent
Robey et al.

(10) Patent No.: US 11,846,375 B2
(45) Date of Patent: Dec. 19, 2023

(54) PUSH-FITTING

(71) Applicant: Mueller Industries, Inc., Collierville, TN (US)

(72) Inventors: Eric J. Robey, Colliers, WV (US); Stephen A. Williams, Jr., Bentleyville, PA (US); John S. Piscitelli, Jefferson Hills, PA (US)

(73) Assignee: Mueller Industries, Inc., Collierville, TN (US)

( * ) Notice: Subject to any disclaimer, the term of this patent is extended or adjusted under 35 U.S.C. 154(b) by 0 days.

(21) Appl. No.: 17/745,111

(22) Filed: May 16, 2022

(65) Prior Publication Data
US 2023/0366495 A1    Nov. 16, 2023

(51) Int. Cl.
*F16L 37/091* (2006.01)
*F16L 43/02* (2006.01)

(52) U.S. Cl.
CPC ............. *F16L 37/091* (2013.01); *F16L 43/02* (2013.01)

(58) Field of Classification Search
CPC ... F16L 37/091; F16L 37/0915; F16L 37/098; F16L 37/0982; F16L 37/0847; F16L 37/12; F16L 37/123; F16L 15/009; F16L 15/008
See application file for complete search history.

(56) References Cited

U.S. PATENT DOCUMENTS

| | | | |
|---|---|---|---|
| 3,365,219 A * | 1/1968 | Nicolaus | F16L 19/086 285/356 |
| 3,367,684 A * | 2/1968 | Anderson | F16L 19/086 285/39 |
| 3,591,205 A * | 7/1971 | Hamburg | F16L 37/091 285/111 |
| 3,679,241 A * | 7/1972 | Hoffmann | F16L 19/075 285/369 |
| 3,999,783 A * | 12/1976 | Legris | F16L 37/0925 285/24 |

(Continued)

FOREIGN PATENT DOCUMENTS

| | | |
|---|---|---|
| CN | 106322006 A | 1/2017 |
| EP | 1139002 A1 | 10/2001 |
| GB | 2294990 A | 5/1996 |

OTHER PUBLICATIONS

Extended European Search Report issued in EP Application No. 23167440.9 dated Sep. 22, 2023.

*Primary Examiner* — Aaron M Dunwoody
(74) *Attorney, Agent, or Firm* — Harness, Dickey & Pierce, P.L.C.

(57) ABSTRACT

A fitting including a housing defining a bore. The bore of the housing at the first open end including a first threaded section, a first annular shoulder located inboard from the first threaded section, and a second annular shoulder located inboard from the first annular shoulder. A grip ring having a plurality of flexible teeth is positioned within the housing and seated against the second annular shoulder, wherein the flexible teeth grip an exterior surface of the pipe or conduit. A bonnet is seated against the first annular shoulder and has an exterior threaded surface that mates with the first threaded section of the bore. A bonnet washer is positioned between the grip ring and the bonnet, and a pair of seal members are positioned between the bonnet washer and the bonnet that sealingly engage with the exterior surface of the pipe or conduit.

20 Claims, 7 Drawing Sheets

(56) References Cited

U.S. PATENT DOCUMENTS

| | | | |
|---|---|---|---|
| 4,059,297 A | 11/1977 | Grahl et al. | |
| 4,135,745 A * | 1/1979 | Dehar | F16L 37/0987 |
| | | | 285/356 |
| 4,842,309 A * | 6/1989 | LaVene | F16L 37/0842 |
| | | | 285/353 |
| 4,878,697 A * | 11/1989 | Henry | F16L 47/04 |
| | | | 285/348 |
| 4,895,395 A * | 1/1990 | Ceriani | F16L 37/0915 |
| | | | 285/39 |
| 5,299,838 A * | 4/1994 | Yang | F16L 19/08 |
| | | | 285/104 |
| 5,320,326 A * | 6/1994 | Ju | F16L 37/0915 |
| | | | 251/149.6 |
| 5,496,076 A * | 3/1996 | Lin | F16L 19/12 |
| | | | 285/348 |
| 7,195,287 B2 * | 3/2007 | Wai | F16L 15/001 |
| | | | 285/392 |
| 8,303,001 B2 * | 11/2012 | Oh | F16L 25/0054 |
| | | | 285/353 |
| 9,574,691 B1 * | 2/2017 | Crompton | F16L 37/0915 |
| 11,262,011 B1 * | 3/2022 | Dias | F16L 19/061 |
| 2012/0126526 A1 * | 5/2012 | LeQuere | F16L 37/0915 |
| | | | 285/104 |
| 2012/0200081 A1 * | 8/2012 | Reznar | E03C 1/021 |
| | | | 285/345 |
| 2017/0307119 A1 * | 10/2017 | Taniguchi | F16L 37/0847 |
| 2018/0372253 A1 * | 12/2018 | Hagen | F16L 37/0915 |
| 2019/0040983 A1 * | 2/2019 | Hagen | F16L 37/091 |
| 2019/0219207 A1 * | 7/2019 | Phillips | F16L 21/02 |
| 2021/0033233 A1 | 2/2021 | Kwak et al. | |
| 2021/0080039 A1 * | 3/2021 | O'Neill | F16L 58/18 |
| 2022/0299142 A1 * | 9/2022 | Ronnheim | F16L 37/091 |

* cited by examiner

PUSH-FITTING

FIELD

The present disclosure relates to a push-fitting.

BACKGROUND

This section provides background information related to the present disclosure which is not necessarily prior art.

Pipes or conduits have traditionally been connected by welding and/or soldering them together using a torch. Soldering pipe fittings can be time-consuming and labor intensive. In recent years, push-fit technology has been employed with piping systems to reduce the time involved in soldering joints. Push-fit methods require minimal knowledge of pipe fittings and involve far fewer materials than soldering.

SUMMARY

This section provides a general summary of the disclosure, and is not a comprehensive disclosure of its full scope or all of its features.

According to a first aspect of the present disclosure, there is provided a fitting that includes a housing defining a bore having a first open end configured for receipt of a pipe or conduit. The bore of the housing at the first open end includes a first threaded section, a first annular shoulder located inboard from the first threaded section that extends radially inward, and a second annular shoulder located inboard from the first annular shoulder that extends radially inward. A grip ring having a plurality of flexible teeth is positioned within the housing and is configured to be seated against the second annular shoulder, wherein the flexible teeth are configured to grip an exterior surface of the pipe or conduit. A bonnet is seated against the first annular shoulder that has an exterior threaded surface that is configured to mate with the first threaded section of the bore. A bonnet washer is positioned between the grip ring and the bonnet, and a pair of seal members are positioned between the bonnet washer and the bonnet that are configured to sealingly engage with the exterior surface of the pipe or conduit.

According to the first aspect, the first annular shoulder may include an annular nub that extends axially outward therefrom, wherein the annular nub is configured to deform when bonnet is seated against the first annular shoulder.

According to the first aspect, the bonnet includes an interior surface having a first cylindrical section that defines a first diameter, a second cylindrical section located inboard from the first cylindrical section that defines a second diameter that is greater than the first diameter, and an annular surface that connects the first cylindrical section and the second cylindrical section, and the pair of seal members are positioned in the second cylindrical section and seated between the bonnet washer and the annular surface.

According to the first aspect, the bonnet includes a third cylindrical section that is connected to the second cylindrical section by another annular surface that is configured as a seat for the bonnet washer.

According to the first aspect, the grip ring includes an annular lip that includes a plurality of spaced-apart circumferential sections, wherein each circumferential section including a first end and a second end.

According to the first aspect, each tooth of the grip ring includes a first leg that extends outward from the first end and a second leg that extends outward from the second end, wherein a distal end of each of the first and second legs defines a biting surface that is configured to bite the exterior surface of the pipe or conduit.

According to the first aspect, a connection leg connects the first and second legs, wherein the connection leg includes a radiused surface that connects each of the biting surfaces.

According to the first aspect, the pair of sealing members are positioned upstream from the grip ring.

According to the first aspect, the bonnet washer includes an axially inwardly extending wedge that extends toward the grip ring.

Lastly, according to the first aspect, the bore may include a second open end opposite to the first open end that is configured for receipt of another pipe or conduit that includes a nipple, wherein the second open end has a second threaded section and an angled surface located inboard from the second threaded section, and a conically-shaped seal is seated against the angled surface.

According to a second aspect of the present disclosure, there is provided a fitting that includes a housing defining a bore having a first open end configured for receipt of a pipe or conduit. The bore of the housing at the first open end includes a first threaded section, a first annular shoulder located inboard from the first threaded section that extends radially inward, a first axially extending surface that extends inboard from the first annular shoulder, a second annular shoulder located inboard from the first axially extending surface that extends radially inward, a second axially extending surface that extend inboard from the second annular shoulder, and a radially inwardly extending tapered surface located inboard from the second axially extending surface. A grip ring having a plurality of teeth is positioned within the housing and seated against the second annular shoulder, wherein the teeth are configured to grip an exterior surface of the pipe or conduit and are flexible in a direction toward the radially inwardly extending tapered surface. A bonnet is seated against the first annular shoulder and has an exterior threaded surface that is configured to mate with the first threaded section of the bore. A bonnet washer is seated against the bonnet, and positioned between the grip ring and the bonnet. At least one seal member is positioned between the bonnet washer and the bonnet that is configured to sealingly engage with the exterior surface of the pipe or conduit, wherein the first annular shoulder includes an annular nub that extends axially outward therefrom in a direction back toward the first threaded section. The annular nub being configured to deform when the bonnet is seated against the first annular shoulder and form a crush seal between the first annular shoulder and the bonnet.

According to the second aspect, the bonnet includes an interior surface having a first cylindrical section that defines a first diameter, a second cylindrical section located inboard from the first cylindrical section that defines a second diameter that is greater than the first diameter, and an annular surface that connects the first cylindrical section and the second cylindrical section, and the at least one seal member is positioned in the second cylindrical section and seated between the bonnet washer and the annular surface.

According to the second aspect, the bonnet includes a third cylindrical section that is connected to the second cylindrical section by another annular surface that is configured as a seat for the bonnet washer.

According to the second aspect, the grip ring may include an annular lip that includes a plurality of spaced-apart circumferential sections, wherein each circumferential section includes a first end and a second end.

According to the second aspect, each tooth of the grip ring includes a first leg that extends outward from the first end and a second leg that extends outward from the second end, and a distal end of each of the first and second legs defines a biting surface that is configured to bite the exterior surface of the pipe or conduit.

According to the second aspect, a connection leg connects the first and second legs, wherein the connection leg may include a radiused surface that connects each of the biting surfaces.

According to the second aspect, the at least one sealing member is positioned upstream from the grip ring.

According to the second aspect, the bonnet washer includes an axially inwardly extending wedge that extends toward the grip ring.

According to the second aspect, a pair of seal members are positioned between the bonnet washer and the bonnet that are configured to sealingly engage with the exterior surface of the pipe or conduit Lastly, according to the second aspect, the bore may include a second open end opposite to the first open end that is configured for receipt of another pipe or conduit that includes a nipple. The second open end has a second threaded section and an angled surface located inboard from the second threaded section, and a conically-shaped seal is seated against the angled surface.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
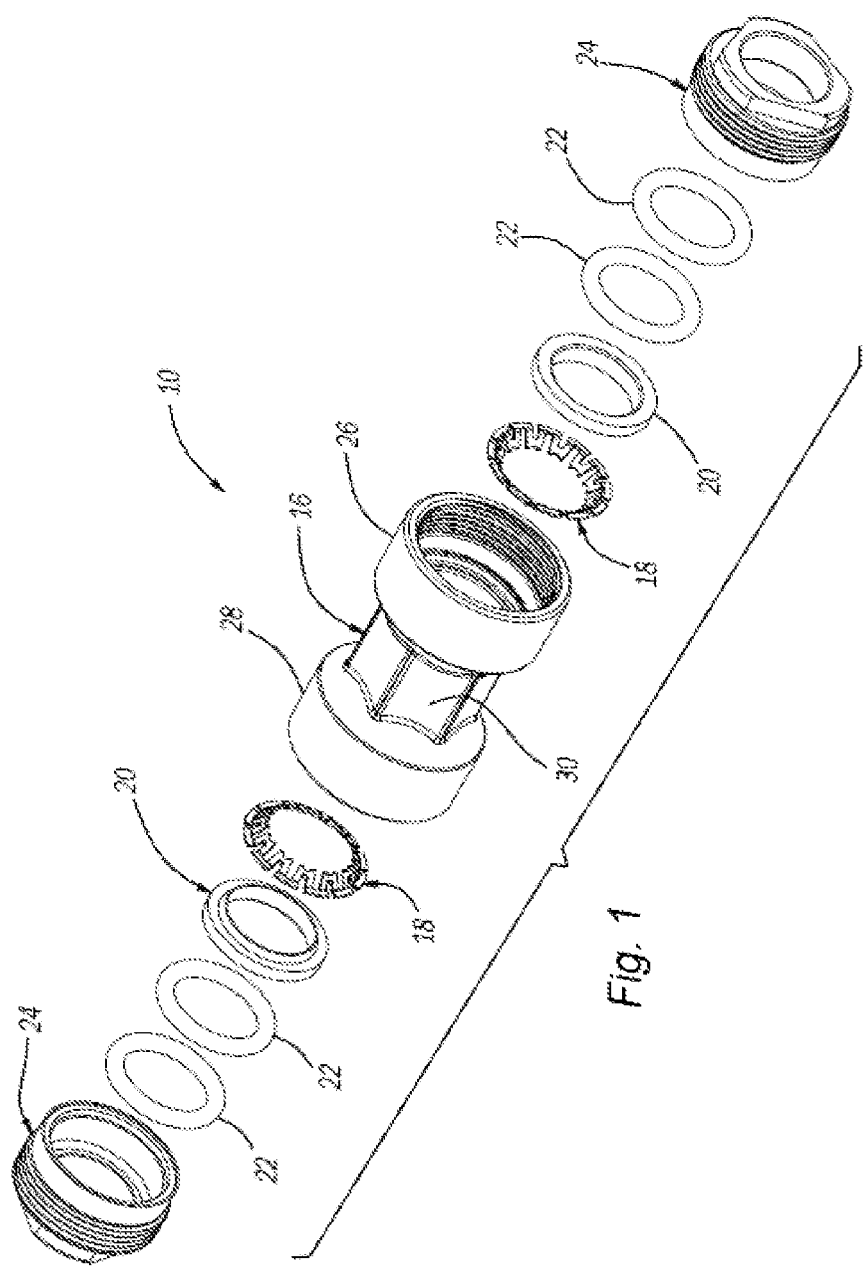
FIG. 1 is an exploded perspective view of a fitting according to an aspect of the present disclosure.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figure 2:
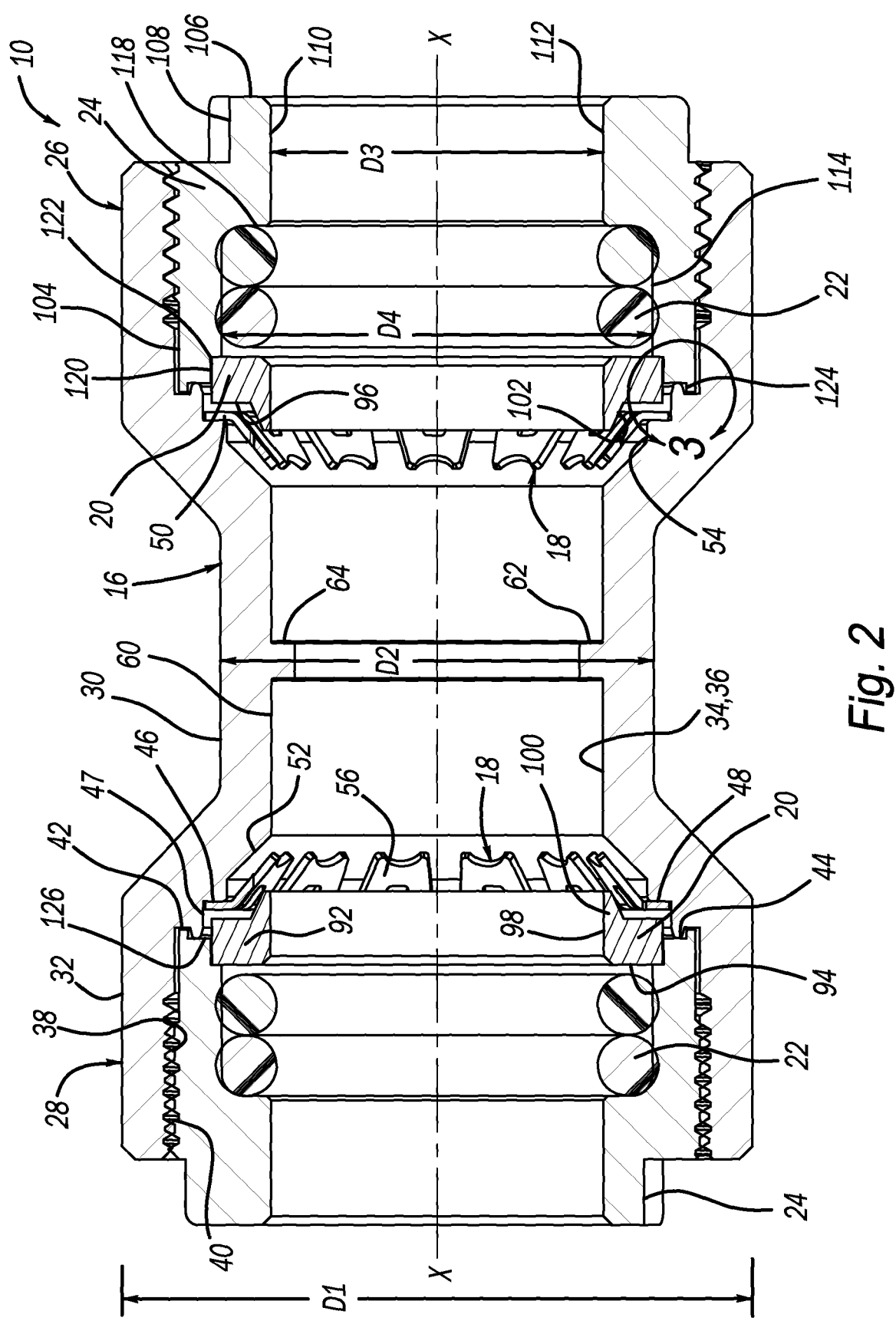
FIG. 2 is a cross-sectional view of the fitting illustrated in FIG. 1, in an assembled state.
Figure 4:
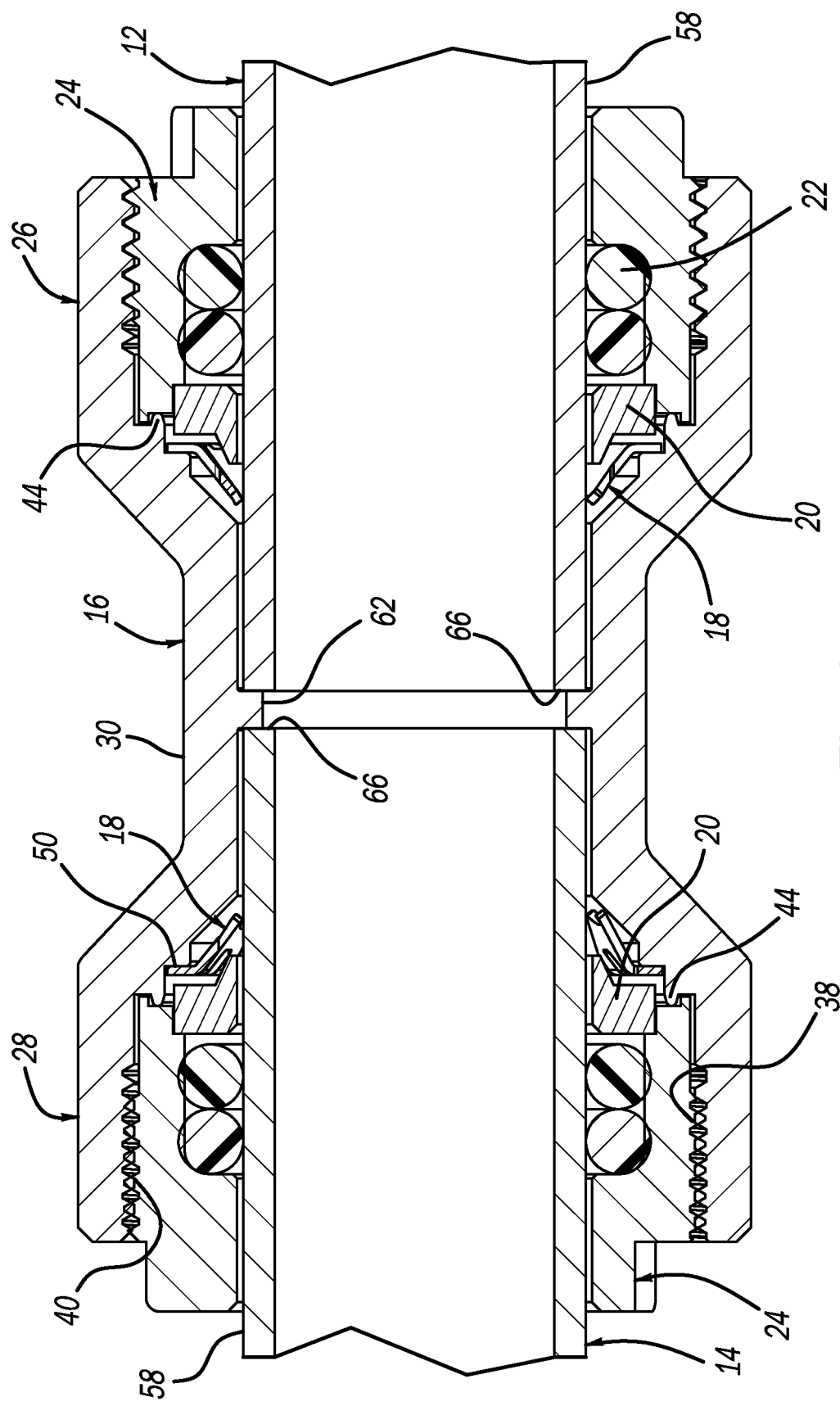
FIG. 4 is a cross-sectional view of the fitting illustrated in FIG. 2, with a pair of pipes or conduits mated therewith.

FIGS. 1, 2, and 4 illustrate a fitting 10 configured to connect a first pipe or conduit 12 to a second pipe or conduit 14 (FIG. 4). In the illustrated embodiment, fitting 10 includes a body or housing 16, a pair of grip rings 18, a pair of bonnet washers 20, two pairs of sealing members 22, and a pair of bonnets 24.

Housing 16 includes a first end 26 configured for receipt of first pipe 12 and a second end 28 configured for receipt of second pipe 14. In the illustrated embodiment, first end 26 and second end 28 are flared. A connection section 30 extends between first end 26 and second end 28. Inasmuch as first end 26 and second 28 are flared, a diameter D1 of first and second ends 26, 28 is greater than a diameter D2 of connection section 30. While the diameter D1 of first and second ends 26 and 28 is the same in FIG. 2, it should be understood that the first and second ends 26 and 28 can have different diameters so that pipes 12 and 14 that are coupled to the first and second ends 26 and 28, respectively, may have different diameters. Regardless whether first and second pipes 12 and 14 have the same or different diameters, when first and second pipes 12 and 14 are coupled to fitting 10, fluid communication between first and second pipes 12 and 14 is enabled.

Figure 3:
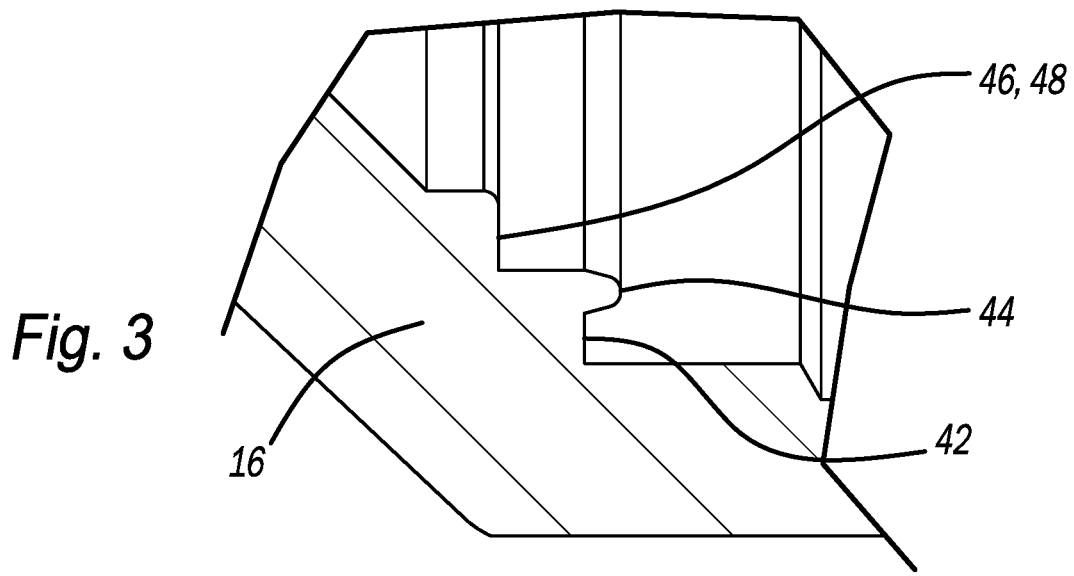
FIG. 3 is a partial cross-sectional view of a portion of a housing of the fitting illustrated in FIGS. 1 and 2.

Housing 16 may be formed of a rigid material such as a metal material. Example metal materials that may be used to form housing 16 include brass, copper, and other metal materials known to those skilled in the art. Housing 16 includes an exterior surface 32 and an interior surface 34, with interior surface 34 defining a bore 36 that extends between first end 26 and second end 28 along axis X. At first and second ends 26 and 28, bore 36 includes a threaded surface 38 that is configured to mate with a threaded end 40 of bonnet 24. A first annular shoulder 42 that extends radially inward toward axis X is located inboard (i.e., in a direction toward connection surface 30) from threaded section 38. An annular nub 44 is formed on first annular shoulder 42 that extends axially outward from shoulder 42 in a direction back toward the threaded surface 38. Nub 44, which is shown in greater detail in FIG. 3, is a sealing feature that is configured to deform when bonnet 24 is mated with bore 36. In other words, nub 44 is a crush seal that assists in ensuring a leak-proof seal when pipe 12 or 14 is mated with fitting 10 and secured by bonnet 24.

Inboard from first annular shoulder 42 is a second annular shoulder 46. A first axially extending surface 47 connects first annular shoulder 42 to second annular shoulder 46. Second annular shoulder 42 is configured to act as a seat 48 for an annular lip 50 of grip ring 18.

Inboard from second annular shoulder 42 is a radially inwardly extending tapered surface 52. A second axially extending surface 54 extends between second annular shoulder 42 and tapered surface 52. Tapered surface 52 is angled to account for the angled teeth 56 that extend radially inwardly from the annular lip 50 of grip ring 18. That is, as will be described in more detail later, when a pipe 12 or 14 is inserted into fitting 10, an exterior surface 58 of the pipe 12 or 14 will contact the teeth 56 and bend the teeth 56 in the inboard direction. Tapered surface 52 permits the teeth 56 to bend without damage thereto. That is, as teeth 56 bend in the inboard direction when pipe 12 or 14 is inserted into fitting 10, there is the potential for teeth 56 to contact tapered surface 52. Because surface 52 is tapered, however, any contact between the tapered surface 52 and the teeth 56 will not damage the teeth 56 such that a reliable grip between the teeth 56 and the exterior surface 58 of the pipe 12 or 14 will be maintained. A cylindrical surface 60 is located inboard from tapered surface 52, which is located at connection section 30. Cylindrical surface 60 may include an annular radially inwardly extending protrusion 62 that acts as a stop 64 that may be abutted with a terminal end 66 of the pipe 12 or 14 when pipe 12 or 14 is inserted into fitting 10.

Figure 5:
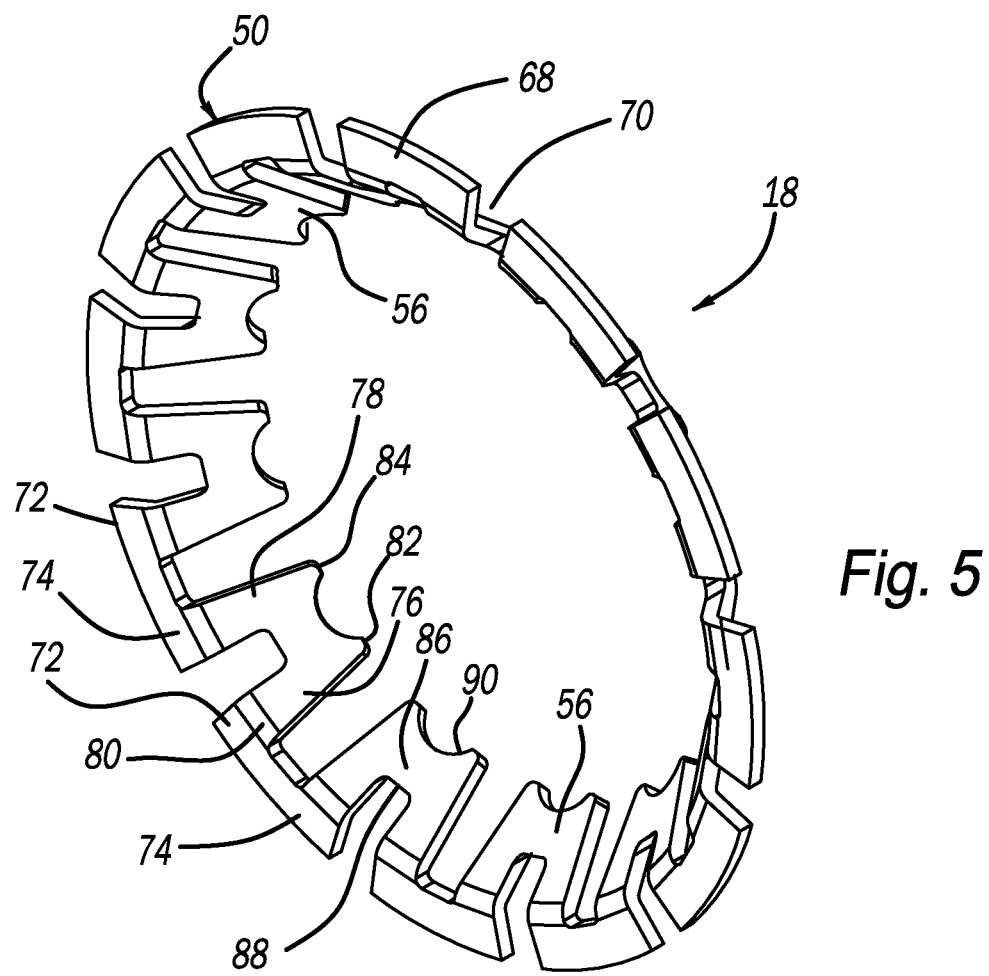
FIG. 5 is a perspective view of a grip ring according to an aspect of the present disclosure.

Now referring to FIG. 5, grip ring 18 will be described in more detail. As noted above, grip ring 18 includes an annular lip 50 and a plurality of teeth 56. In the illustrated embodiment, annular lip 50 includes a plurality of spaced-apart circumferential sections 68 rather than being formed as a continuous annular ring. Circumferential sections 68 are separated by spaces 70. While grip ring 18 preferably includes circumferential sections 68 separated by spaces 70, it should be understood that annular lip 50 may be continuously formed without departing from the scope of the present disclosure.

Circumferential sections 68 include a first end 72 and a second end 74. Each tooth 56 includes a first leg 76 that extends outward from first end 72 and a second leg 78 that extend outward from second end 74. First and second legs 76, 78 each include a proximal end 80 connected to circumferential section 68 and a distal end 82 that defines a biting surface 84 that is configured to "bite" the exterior surface 58 of pipe 12 or 14. A connection leg 86 connects first leg 76 and second leg 78. Connection leg 86 includes a linear surface 88 that faces annular lip 50 and a radiused surface 90 that faces away from annular lip 50. Radiused surface 90 connects the biting surfaces 84 that are formed at the distal end 82 of each of the first leg 76 and the second leg 78. Because each tooth 56 includes a pair of biting surfaces 84, additional touch points between the grip ring 18 and the exterior surface 58 of pipe 12 or 14 are created that improves the retention strength of the grip ring 18.

It should be understood that in smaller-diameter fittings 10 that are configured for use with smaller-diameter pipes 12 or 14, each component of the fitting 10 is smaller in size, including grip ring 18. In these instances, grip ring 18 may not necessarily include a radiused surface 90 that connects a pair of biting surfaces 84. In contrast, first and second legs 76, 78 may be angled toward each other to form a substantially triangular-formed tooth (not shown) and an apex of the tooth defines the biting surface 84. Notwithstanding the lack of a radiused surface 90, the linear surface 88 may remain between the legs 76 and 78 if desired.

Again referring to FIGS. 1, 2, and 4, bonnet washer 20 is positioned between grip ring 18 and bonnet 24. Bonnet washer 20 includes a ring-shaped body 92 having a first annular surface 94 that faces bonnet 24 and is configured to be engaged with bonnet 24, a second annular surface 96 that faces grip ring 18 and is configured to engage with annular lip 50 of grip ring 18, and a cylindrical surface 98 that is configured to act as a bearing surface for exterior surface 58 of pipe 12 or 14 when pipe 12 or 14 is mated with fitting 10. An axially inwardly extending wedge 100 extends outward from second annular surface 96. Wedge 98 is defined by a portion of cylindrical surface 98 and an angled surface 102 that is configured to contact teeth 56 of grip ring 18.

Still referring to FIGS. 1, 2, and 4 bonnet 24 is generally a cylindrical member having an outer surface 104 that is threaded at threaded end 40 such it may threadingly engage with threaded surface 38 of housing 16. Extending outward from threaded end 40 is an annular protrusion 106 having a plurality of gripping surfaces 108 that are configured to be engaged with a wrench or some other type of tool to rotate bonnet 24 relative to housing 16 to ensure a tight threaded connection between bonnet 24 and housing 16.

Bonnet 24 includes an interior surface 110. Interior surface 110 includes a first cylindrical section 112 as it extends from annular protrusion 106 in a direction toward sealing members 22 having a diameter D3. Interior surface 110 also includes a second cylindrical section 114 having a diameter D4 that is greater than the diameter D3. An annular surface 118 connects first cylindrical section 112 and second cylindrical section 114 that serves as a seat or abutment surface for sealing members 22.

Interior surface 110 includes a third cylindrical section 120 that is connected to second cylindrical surface 114 by another annular surface 122, which serves as a seat or abutment surface for bonnet washer 20. When bonnet washer 20 is seated against annular surface 122, seal members 22 are located between first annular surface 94 of bonnet washer 20 and annular surface 118 of bonnet 24, which prevents or at least substantially minimizes sealing members 22 from being displaced during engagement of pipe 12 or 14 with fitting 10. Although not necessarily required, bonnet 24 may also include a fourth cylindrical section 124 that is connected to third cylindrical section 120 by an annular sealing surface 126.

Annular sealing surface 126 is configured to engage with nub 44 and deform nub 44 when bonnet 24 is fully engaged with housing 16. As noted above, when nub 44 is deformed, a seal is developed between bonnet 24 and housing 16. The seal developed between bonnet 24 and housing 16 is a beneficial aspect of the present disclosure because a separate sealing member or gasket is not required, which reduces the number of parts and costs associated with manufacturing fitting 10. In addition, the seal that is developed through deformation of nub 44 assists with increasing the sealing ability of the fitting 10 when fitting 10 is used in, for example, a heating or cooling application where the fluid that passes through the fitting 10 is a refrigerant. In this regard, various refrigerants may include molecules that are smaller in comparison to other fluids such as, for example, water. The use of the seal developed by crushing nub 44 in combination with sealing members 22 prevents or at least substantially minimizes the small molecules of the refrigerant from escaping the fitting 10 during use thereof.

In addition, with respect to the sealing ability provided by fitting 10, it should be noted that sealing members 22 are located upstream from grip ring 18. This is a beneficial configuration in comparison to a configuration where the sealing member(s) are located downstream from the grip ring 18 from the standpoint that when pipe 12 or 14 is inserted into fitting 10, the exterior surface 58 of pipe 12 or 14 will not be scratched or damaged by the grip ring 18 before coming into sealing contact with the sealing member(s). When the exterior surface 58 of pipe 12 or 14 is scratched or damaged by the teeth of grip ring 18, a fluid-tight seal between the sealing member(s) and the exterior surface 58 of pipe 12 or 14 cannot necessarily be ensured. Thus, because sealing members 22 are placed in sealing engagement with exterior surface 58 of pipe 12 or 14 before the exterior surface 58 is gripped by grip ring 18, a fluid-tight seal between exterior surface 58 and sealing members 22 can be formed more reliably.

To assemble fitting 10, grip ring 18 is first inserted into housing 16 and annular lip 50 is seated against second annular shoulder 46. Bonnet washer 20 may then be inserted into housing 16 and seated against grip ring 18. Sealing members 22 may then be seated against annular surface 118 of bonnet 24, and bonnet 24 threadingly engaged with housing 16. During engagement between bonnet 24 and housing 16, bonnet washer 20 will seat against annular surface 122 and sealing members 22 will be properly located between bonnet washer 20 and bonnet 24. As bonnet 24 is tightly engaged with housing 16, nub 44 will deform and create a seal between housing 16 and bonnet 24 and complete formation of fitting 10 will be achieved. Pipe 12 or 14 may then be inserted into housing 16.

As pipe 12 or 14 is inserted into housing 16, pipe 12 or 14 will slide past sealing members 22 and reach bonnet washer 20. While cylindrical surface of bonnet washer 20 acts as a bearing surface for pipe 12 or 14, bonnet washer 20 may be slightly advanced forward toward grip ring 18. As pipe 12 or 14 reaches teeth 56, biting surfaces 84 of teeth 56 will engage the exterior surface 58 of pipe 12 or 14, but permit pipe 12 or 14 to advance until reaching protrusion 62 where pipe 12 or 14 can no longer advance into housing 16. Due to contact between sealing members 22 and exterior surface 58 of pipe 12 or 14, and the seal created due to deformation of nub 44, a leak-proof seal is achieved between pipe 12 or 14 and fitting 10.

As noted above, when biting surfaces 84 of teeth 56 engage exterior surface 58 of pipe 12 or 14, pipe 12 or 14 is permitted to advance until reaching protrusion 62. This is because teeth 56 are angled in a direction toward protrusion 62 (FIG. 2). Teeth 56 being angled toward protrusion 62 also assists in preventing pipe 12 or 14 from being removed from fitting 10 because if a force is exerted on pipe 12 or 14 to pull pipe 12 or 14 rearwardly or if a pressure within fitting 10 reaches an extent that attempts to push pipe 12 or 14 rearwardly, the teeth 56 will further bite into exterior surface 58 of pipe 12 or 14. It should be understood, however, that when pipe 12 or 14 is formed of a relatively soft material such as copper or a polymeric material, the exterior surface 58 of pipe 12 or 14 can deform more easily. If a sufficient force is exerted on pipe 12 or 14 that is able to push or pull pipe 12 or 14 rearwardly, the teeth 56 may begin to deform by flattening out, which can cause teeth 56 to deform exterior surface 58 of pipe 12 or 14 radially inwardly.

If the force exerted on pipe 12 or 14 that pushes or pulls pipe 12 or 14 rearwardly continues to increase, there is the risk that teeth 56 may completely flatten out and deflect rearwardly to an extent that pipe 12 or 14 can be released from fitting 10. Wedge 100 of bonnet washer 20 is designed to interfere with the ability of teeth 56 to flatten out and/or deflect rearwardly. As best shown in FIG. 2, there is some space between wedge 100 and teeth 56 of grip ring 18 that enables teeth 56 to deform and bite deeper into exterior surface 58 of pipe 12 or 14. Due to wedge 100 of bonnet washer 20, however, the teeth 56 are prevented from fully flattening out or deflecting to prevent pipe 12 or 14 from being removed from fitting 10. Wedge 100, therefore, is configured to act as a support feature for teeth 56 during use of fitting 10.

Figure 6:
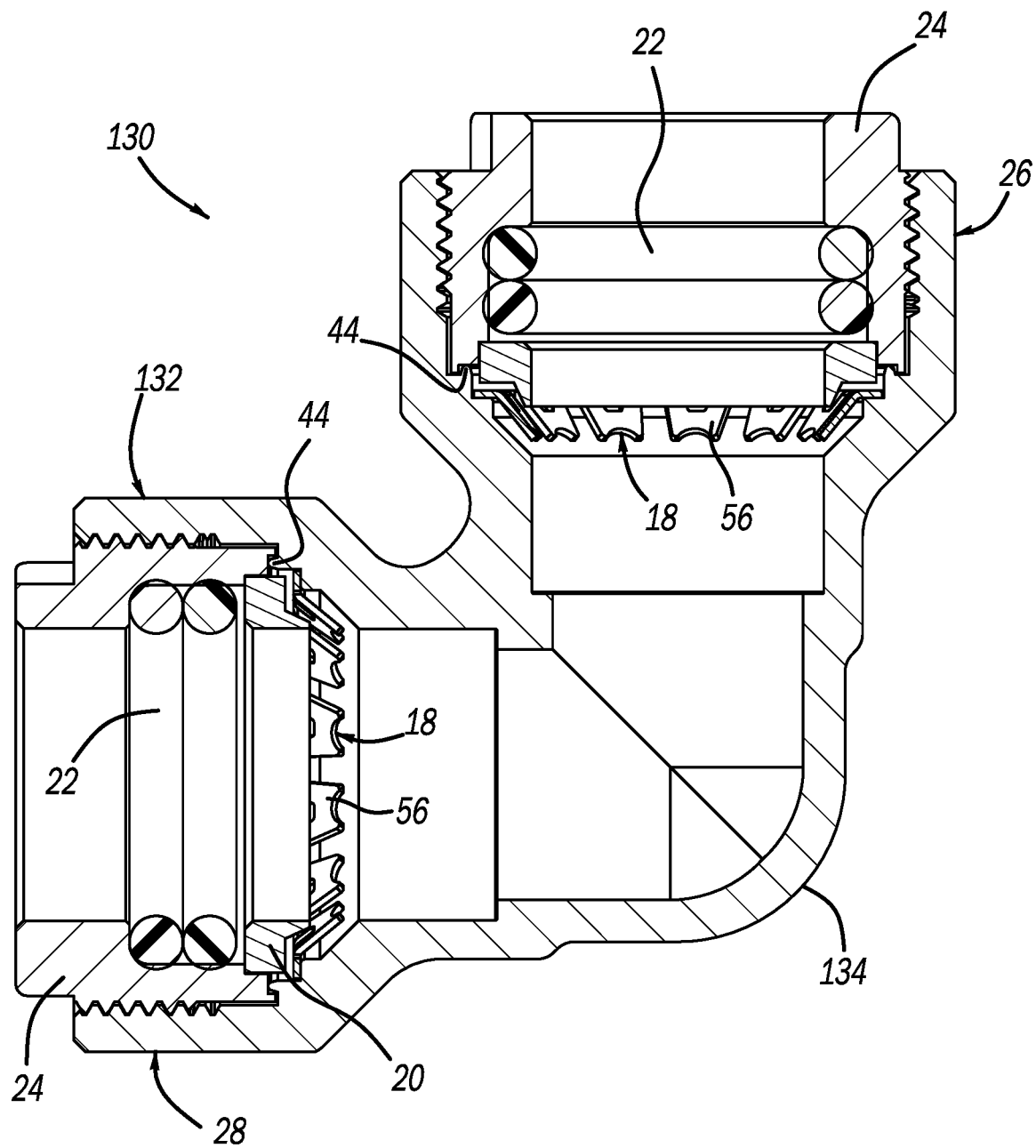
FIG. 6 is a cross-sectional view of another fitting according to an aspect of the present disclosure.

FIGS. 1, 2, and 4 illustrate a fitting 10 having a linear axis X. The present disclosure should not be limited thereto. In this regard, as shown in FIG. 6, it should be understood that the teachings of the present disclosure are equally applicable to, for example, an elbow fitting 130. Elbow fitting 130 is substantially similar to fitting 10 described above, but housing 132 is L-shaped rather than having an entirely linear axis X like fitting 10. Specifically, connection section 134 of elbow fitting 130 is shaped to account for the L shape. Inasmuch as the remaining features of elbow fitting 130 are the same as those described above relative to fitting 10, further description thereof will be omitted.

Figure 7:
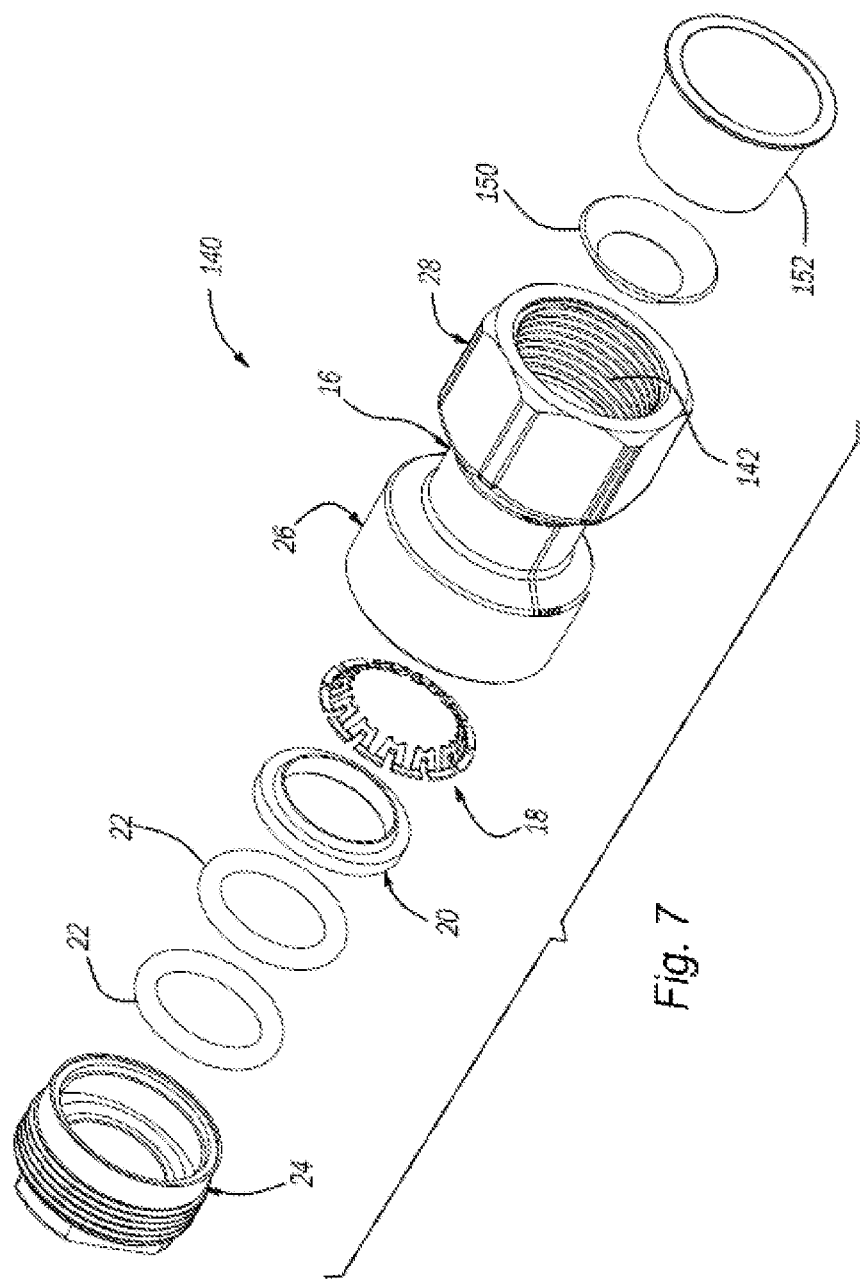
FIG. 7 is an exploded perspective view of another fitting according to an aspect of the present disclosure.
Figure 8:
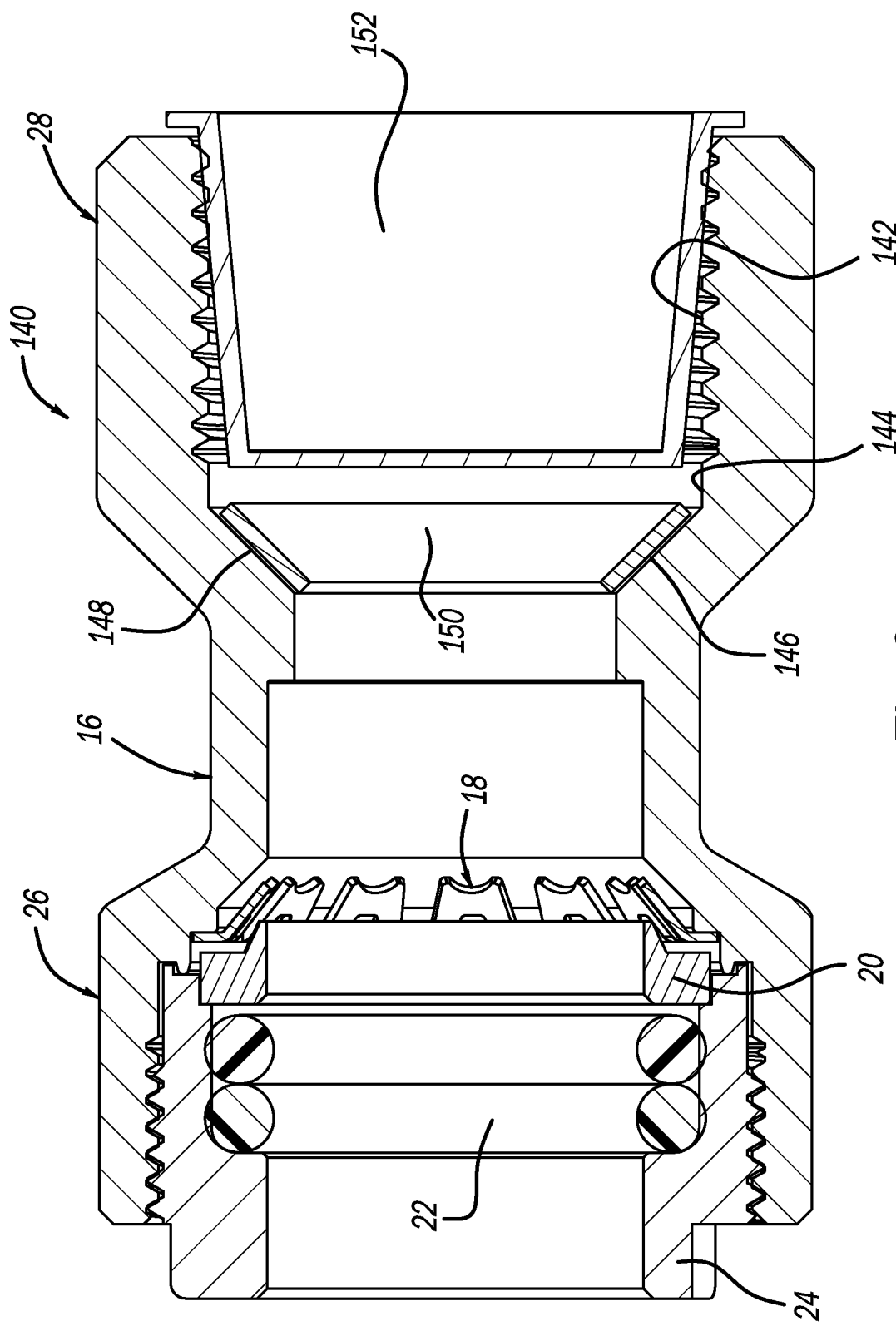
FIG. 8 is a cross-sectional view of the fitting illustrated in FIG. 7.

Now referring to FIGS. 7 and 8, yet another fitting 140 according to the present disclosure is illustrated. Fitting 140 is similar to fittings 10 and 130 described above, but second end 28 is not designed for receipt of a pipe 12 or 14. Rather, second end 28 is configured for receipt of a pipe having a nipple (not shown) that can provide a fluid to fitting 140.

Inasmuch as the first end 26 of the fitting 140 is the same as shown at, for example, FIG. 2 and described above, description thereof will be omitted.

Second end 28 of fitting 140 includes an interior threaded surface 142 that is configured to mate with a threaded surface (not shown) formed on a pipe including a nipple (not shown). Inboard from threaded surface 142 is a cylindrical section 144 that transitions to an angled surface 146. Angled surface 146 serves as a seat 148 for a conically-shaped seal 150 that is designed to provide a fluid-tight seal when the conically-shaped nipple (not shown) is engaged therewith. Seal 150 may be formed of a metal material such as copper, or a polymeric material if desired. Although not required, fitting 140 may be provided with a protective cap 152 that must be removed from fitting 140 prior to the pipe including the nipple (not shown) being coupled to fitting 140. Cap 152 may be formed of, for example, a polymeric material.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A fitting, comprising:
   a housing defining a bore having a first open end configured for receipt of a pipe or conduit, the bore of the housing at the first open end including a first threaded section, a first annular shoulder located inboard from the first threaded section that extends radially inward, and a second annular shoulder located inboard from the first annular shoulder that extends radially inward;
   a grip ring having a plurality of flexible teeth positioned within the housing and configured to be seated against the second annular shoulder, the flexible teeth being configured to grip an exterior surface of the pipe or conduit;
   a bonnet configured to be seated against the first annular shoulder and having an exterior threaded surface that is configured to mate with the first threaded section of the bore;
   a bonnet washer configured to be positioned between the grip ring and the bonnet; and
   a pair of seal members positioned between the bonnet washer and the bonnet that are configured to sealingly engage with the exterior surface of the pipe or conduit.

2. The fitting according to claim 1, wherein the first annular shoulder includes an annular nub that extends axially outward therefrom, the annular nub being configured to deform when bonnet is seated against the first annular shoulder.

3. The fitting according to claim 1, wherein the bonnet includes an interior surface having a first cylindrical section that defines a first diameter, a second cylindrical section located inboard from the first cylindrical section that defines a second diameter that is greater than the first diameter, and an annular surface that connects the first cylindrical section and the second cylindrical section, and the pair of seal members are positioned in the second cylindrical section and seated between the bonnet washer and the annular surface.

4. The fitting according to claim 3, wherein the bonnet includes a third cylindrical section that is connected to the second cylindrical section by another annular surface that is configured as a seat for the bonnet washer.

5. The fitting according to claim 1, wherein the grip ring includes an annular lip that includes a plurality of spaced-apart circumferential sections, each circumferential section including a first end and a second end.

6. The fitting according to claim 5, where each tooth of the grip ring includes a first leg that extends outward from the first end and a second leg that extends outward from the second end, a distal end of each of the first and second legs defining a biting surface that is configured to bite the exterior surface of the pipe or conduit.

7. The fitting according to claim 6, wherein a connection leg connects the first and second legs, the connection leg including a radiused surface that connects each of the biting surface.

8. The fitting according to claim 1, wherein the pair of sealing members are positioned upstream from the grip ring.

9. The fitting according to claim 1, wherein the bonnet washer includes an axially inwardly extending wedge that extends toward the grip ring.

10. The fitting according to claim 1, wherein the bore includes a second open end opposite to the first open end that is configured for receipt of another pipe or conduit that includes a nipple, the second open end having a second threaded section and an angled surface located inboard from the second threaded section, and a conically-shaped seal configured to be seated against the angled surface.

11. A fitting, comprising:
    a housing defining a bore having a first open end configured for receipt of a pipe or conduit, the bore of the housing at the first open end including a first threaded section, a first annular shoulder located inboard from the first threaded section that extends radially inward, a first axially extending surface that extends inboard from the first annular shoulder, a second annular shoulder located inboard from the first axially extending surface that extends radially inward, a second axially extending surface that extend inboard from the second annular shoulder, and a radially inwardly extending tapered surface located inboard from the second axially extending surface;
    a grip ring having a plurality of teeth positioned within the housing and configured to be seated against the second annular shoulder, the teeth being configured to grip an exterior surface of the pipe or conduit and being flexible in a direction toward the radially inwardly extending tapered surface;
    a bonnet configured to be seated against the first annular shoulder and having an exterior threaded surface that is configured to mate with the first threaded section of the bore;
    a bonnet washer configured to be seated against the bonnet, and positioned between the grip ring and the bonnet; and
    at least one seal member positioned between the bonnet washer and the bonnet that is configured to sealingly engage with the exterior surface of the pipe or conduit, wherein the first annular shoulder includes an annular nub that extends axially outward therefrom in a direction back toward the first threaded section, the annular nub being configured to deform when the bonnet is seated against the first annular shoulder and form a crush seal between the first annular shoulder and the bonnet.

12. The fitting according to claim 11, wherein the bonnet includes an interior surface having a first cylindrical section that defines a first diameter, a second cylindrical section located inboard from the first cylindrical section that defines a second diameter that is greater than the first diameter, and an annular surface that connects the first cylindrical section and the second cylindrical section, and the at least one seal member is positioned in the second cylindrical section and seated between the bonnet washer and the annular surface.

13. The fitting according to claim 12, wherein the bonnet includes a third cylindrical section that is connected to the second cylindrical section by another annular surface that is configured as a seat for the bonnet washer.

14. The fitting according to claim 11, wherein the grip ring includes an annular lip that includes a plurality of spaced-apart circumferential sections, each circumferential section including a first end and a second end.

15. The fitting according to claim 14, where each tooth of the grip ring includes a first leg that extends outward from the first end and a second leg that extends outward from the second end, a distal end of each of the first and second legs defining a biting surface that is configured to bite the exterior surface of the pipe or conduit.

16. The fitting according to claim 15, wherein a connection leg connects the first and second legs, the connection leg including a radiused surface that connects each of the biting surfaces.

17. The fitting according to claim 11, wherein the at least one sealing member is positioned upstream from the grip ring.

18. The fitting according to claim 11, wherein the bonnet washer includes an axially inwardly extending wedge that extends toward the grip ring.

19. The fitting according to claim 11, wherein a pair of the sealing members are positioned between the bonnet washer and the bonnet that are configured to sealingly engage with the exterior surface of the pipe or conduit.

20. The fitting according to claim 11, wherein the bore includes a second open end opposite to the first open end that is configured for receipt of another pipe or conduit that includes a nipple, the second open end having a second threaded section and an angled surface located inboard from the second threaded section, and a conically-shaped seal configured to be seated against the angled surface.

* * * * *